United States Patent
Schaefer

[15] 3,663,847
[45] May 16, 1972

[54] INTERMEDIATE BEARING CONSTRUCTION

[72] Inventor: Edward J. Schaefer, Bluffton, Ind.
[73] Assignee: Franklin Electric Co., Inc., Bluffton, Ind.
[22] Filed: Sept. 18, 1970
[21] Appl. No.: 73,443

[52] U.S. Cl. ................................................. 310/90
[51] Int. Cl. ........................................... H02k 5/16
[58] Field of Search ....................... 310/87, 90, 214

[56] References Cited

UNITED STATES PATENTS

| | | | |
|---|---|---|---|
| 2,781,464 | 2/1957 | Timms | 310/90 |
| 3,551,714 | 12/1970 | Boyd | 310/90 |

Primary Examiner—D. X. Sliney
Attorney—Hibben, Noyes & Bicknell

[57] ABSTRACT

An intermediate bearing for a motor of great length, comprising an inner annular member secured to the shaft of the motor, and an outer annular member. Bearing surfaces are provided on the inner and outer members. The inner member is secured to the shaft and rotates with the shaft in the outer member. The outer member is secured within the cavity of the stator of the motor by projections on the bearing which engage the stator to prevent the outer member of the bearing from rotating. The projections may engage axial slots formed in the stator, thus preventing rotation of the bearing but permitting axial displacement of the bearing to accommodate thermal expansion of the motor parts. The projections may be fixed in position, or may expand into engagement with the stator upon exposure to certain liquids, or may be cammed into engagement with the stator.

13 Claims, 8 Drawing Figures

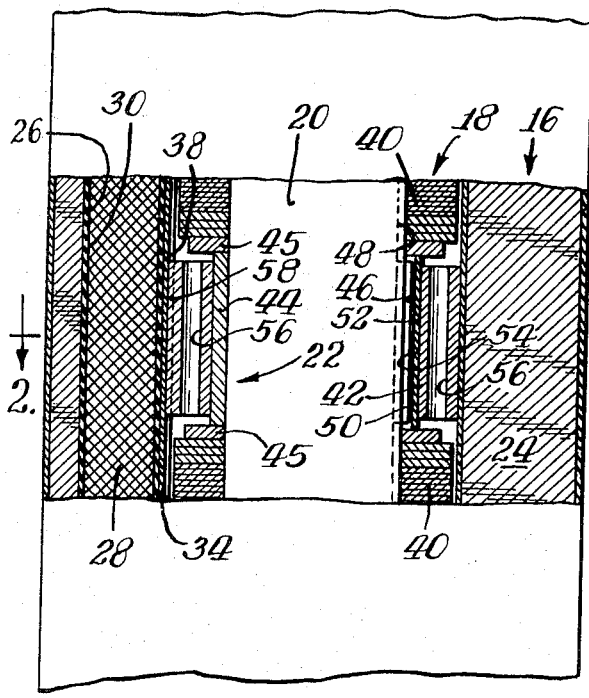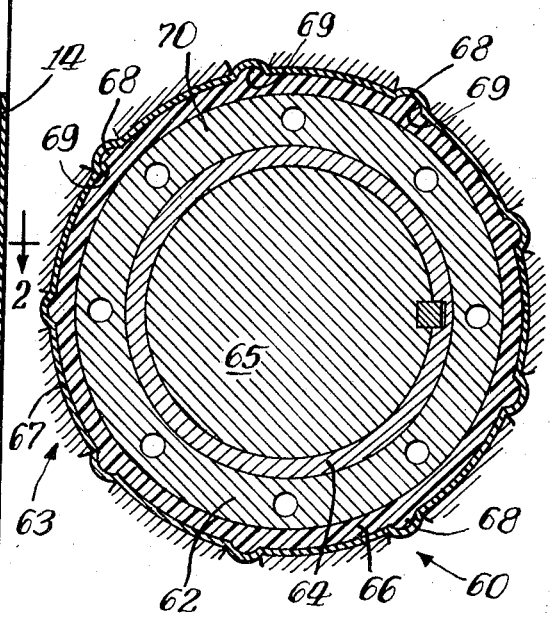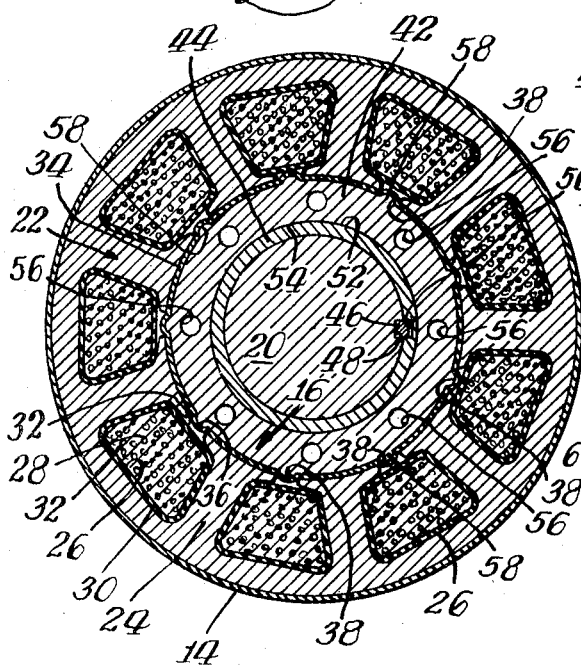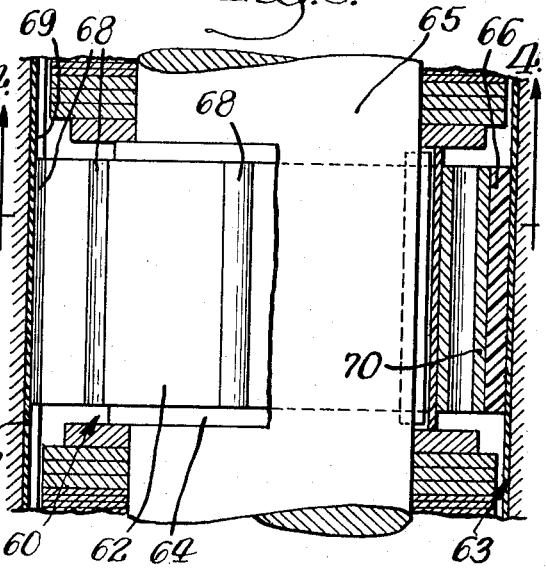
Inventor:—
Edward J. Schaefer,
By Hibben Noyes & Bicknell,
Attys.

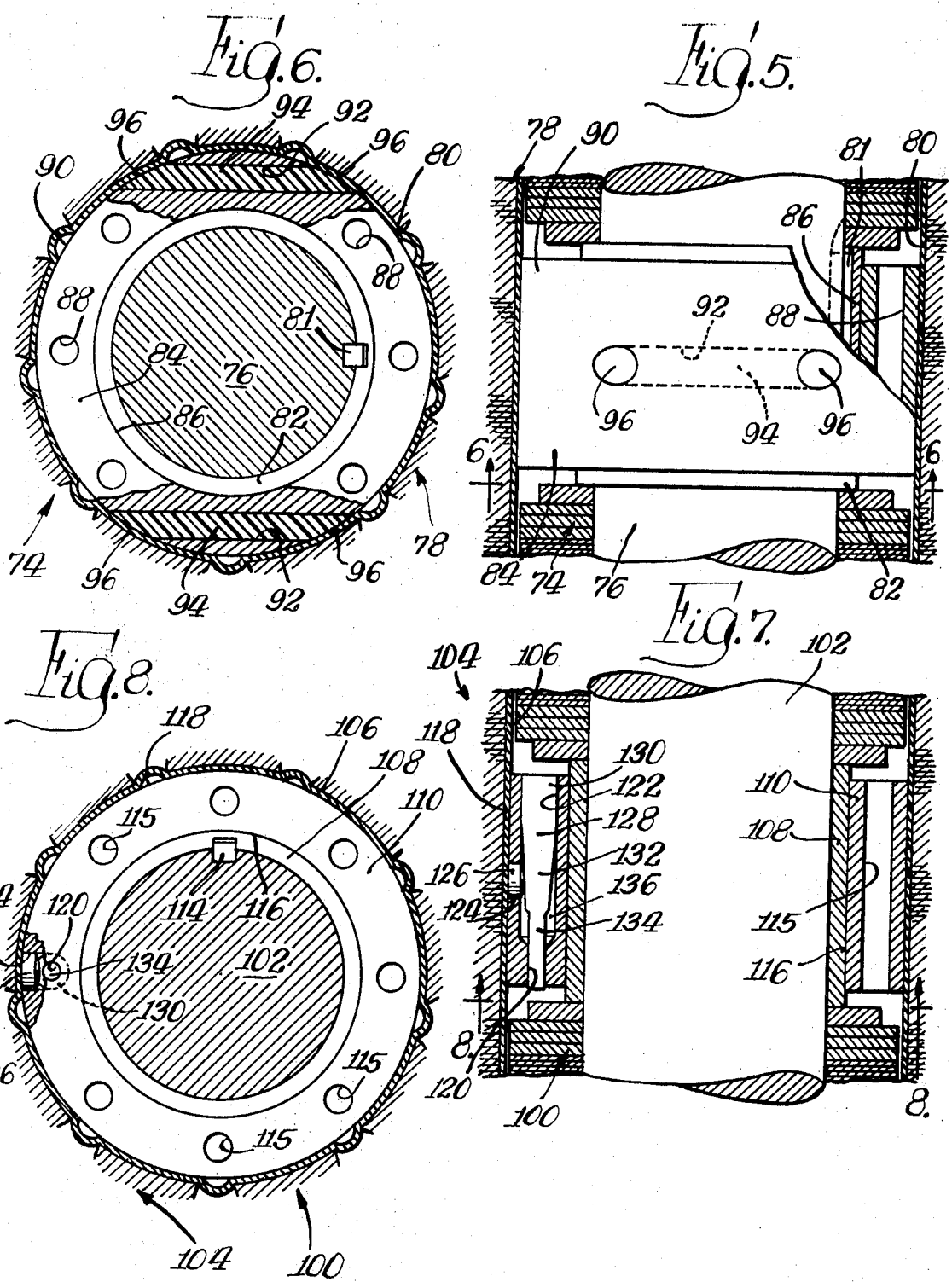

INTERMEDIATE BEARING CONSTRUCTION

This invention relates to a bearing for a motor shaft and in more particular to an intermediate bearing for a motor shaft of great length.

There is need for high horsepower electric motors to drive, for example, deep well pumps. Since the diameter of such a motor is fixed at a relatively small diameter, due to the dimensions of the well, the most practical method of increasing the horsepower of the motor is to increase its length. (Such a motor includes a housing having a stator, a rotor, a shaft, and bearings for supporting the shaft.) Heretofore, the motor bearings of a long motor have been located at the respective ends of the motor shaft and also intermediate the ends of the shaft. Various attempts have been made to anchor or secure the intermediate bearings to the motor housing, but such intermediate bearings were restricted or limited against axial displacement in response to thermal expansion of the motor parts. This may be troublesome with shafts of lengths of 20 feet or more. Further, because of the restricted space within the motor, prior art intermediate bearings could not be easily secured in place. Care had to be taken while assembling the intermediate bearing in the motor to prevent damage of the interior of the motor by the bearing.

The present invention provides an intermediate bearing which can be easily secured in place within the stator or housing of the motor. An intermediate bearing in accordance with the present invention comprises an inner member adapted to be secured to the motor shaft, and an outer member, the inner and outer members having bearing surfaces therebetween. The outer member includes means adapted to engage the motor stator to prevent rotation of the outer member of the bearing in the stator. In a preferred form of the invention the outer member has projections which engage axial slots in the stator. Further, to minimize the danger of damaging the stator and to permit a tighter fit with the stator, the outer periphery of the bearing may be made of a non-scratching or softer material than the stator. Such tighter fit reduces vibration of the intermediate bearing.

It is the primary object of the present invention to provide a novel intermediate bearing for a motor shaft.

Another object of the present invention is to provide an intermediate bearing which may be easily installed in a motor.

These and other objects of the present invention will become apparent from the following detailed description and the accompanying figures of the drawings in which:

FIG. 1 is a fragmentary view partially in section of a motor having an intermediate bearing embodying the present invention;

FIG. 2 is a cross-sectional view taken on the line 2—2 of FIG. 1;

FIG. 3 is an enlarged elevational view of another embodiment of the present invention, with portions thereof broken away;

FIG. 4 is a cross-sectional view taken on the line 4—4 of FIG. 3;

FIG. 5 is an enlarged elevational view similar to FIG. 3 of still another embodiment of the present invention, with portions thereof broken away;

FIG. 6 is a cross-sectional view taken on the line 6—6 of FIG. 5, with portions thereof broken away;

FIG. 7 is an enlarged cross-sectional view similar to FIGS. 3 and 5 of yet another embodiment of the present invention; and FIG. 8 is a cross-sectional view taken on the line 8—8 of FIG. 7.

Shown in FIG. 1 is a portion of an electric motor designed to be operated while submerged in a liquid in a deep well of relatively small diameter. Because of the space restrictions the motor is of an elongated form, for example 20 feet in length, to obtain a high horsepower rating. The motor comprises an outer shell 14 preferably of stainless steel, within which is mounted a stator 16 of annular form and a rotor 18 positioned within the stator cavity. In the present instance, the rotor 18 is carried on a shaft 20 supported by end bearings (not shown) secured to end bells (not shown) of the motor, and has one or more intermediate bearings 22. Only one such intermediate bearing 22 is illustrated in FIG. 1, it being understood that the number of such bearings used depends upon the length of the motor.

The stator 16 in this instance is similar to that shown in E. J. Schaefer U. S. Pat. No. 2,698,911, and comprises a core structure formed by a stack of annular laminations indicated at 24, and the laminations have punched therein a plurality of inwardly opening slots 26 to receive windings 28. Insulating material 30 is disposed around the interior of the slots 26. The space within each slot 26 and around the windings 28 may be filled with insulating potting material, as is indicated at 32. The interior surface of the stator is preferably sealed by a thin interior sleeve or liner 34 which is bonded by an adhesive to the stator laminations. In order to render the liner 34 more rigid and to enhance the attachment of the liner to the stator, the liner 34 is expanded outwardly into the slots 26 of the laminations 24, as shown in FIG. 2 at 36, thus forming axial indentations or slots 38 on the interior of the liner 34 which run the full length of the stator laminations.

The rotor 18 comprises a stack of laminations 40 secured together and to the shaft 20 as by keys (not shown) positioned in key slots cut in the shaft 20 and the rotor laminations 40. The rotor 18, in motors of great length, may be formed in two or more segments, and an intermediate bearing 22 is located between each pair of segments of the rotor to minimize radial deflection of the shaft 20 and to eliminate possible rubbing contact between the stator 16 and the rotor 18. By using intermediate bearings, the length and thus the horsepower rating of the motor may be increased.

The intermediate bearing 22 is illustrated in FIGS. 1 and 2, and comprises an outer annular member 42 secured to the stator 16, as is hereinafter described, and an inner annular member 44 secured to the shaft 20. The ends of the inner annular member 44 abut washers 45 adjacent the end laminations of the segments of the rotor 18. A key 46 is located in key slots 48 and 50 formed in the shaft 20 and the inner member 44. The inner member 44 has a bearing surface 52 on its outer periphery and the outer annular member 42 has a bearing surface 54 at its inner surface in which the inner member 44 rotates. The bearing surface 54 may be provided by the outer member 42 or may be provided by a layer of bearing metal. The motor is a type which is filled with a liquid which serves as a coolant and a lubricant, and axial openings 56 are located in the outer member 42 to accommodate flow of this liquid.

At the outer periphery of the outer member 42 is provided at least one, and in this instance, a plurality of radial projections 58 which engage the slots 38 of the liner 34. The projections 58 are generally rounded and prevent the outer member 42 from rotating but they are sufficiently loose fitting that they permit the outer member to shift axially to accommodate any thermal expansion or contraction of the motor parts. Should such expansion or contraction occur, one of the washers 45 would abut the outer member 42 and cause it to be axially displaced. As mentioned above, the projections 58 and other portions on the periphery of the outer member 42 fit within the liner 34 but are sufficiently free to permit such axial displacement. Such fit is possible since the resistance to rotation of the outer member 42 is provided by the projections 58 of that member and not be the fit between the bearing and liner.

The intermediate bearing 22 may be easily installed in the motor simply by slipping a shaft assembly comprising the shaft 20, segments of the rotor 18, and intermediate bearings 22 into the stator cavity, care being taken to align the projections 58 with the slots 38 of the liner 34.

In FIGS. 3 and 4 is shown another embodiment of an intermediate bearing 60 for a motor similar to the motor shown in FIG. 1, having a stator 63 including a liner 67. The bearing 60 is generally similar to the bearing 22 and comprises an outer annular member 62 and an inner annular member 64 which is the same as the inner member 44 shown in FIGS. 1 and 2. The inner member 64 is secured to a shaft 65 of the rotor. The outer member 62 has an outer portion 66 having projections 68 engaging slots 69 in the liner 67 of the stator 63. The outer portion 66 is made of a non-scratching or soft material, such as brass or plastic, so as not to scratch or damage the liner 67 of the stator 63 during assembly. The inner portion 70 of the outer member 62 may bear directly against the inner member 64 or may be provided with a layer of bearing material engaging the member 64.

In FIGS. 5 and 6 is illustrated still another embodiment of an intermediate bearing 74 for use in a motor having a shaft 76 and stator 78. The stator 78 has a liner 80. The intermediate bearing 74 includes an inner annular member 82 secured to the shaft 76 by a key 81, and an outer annular member 84 secured, as hereinafter described, to the stator 78 so as to prevent rotation. The inner member 82 is generally similar to the inner members 44 and 64. The outer member 84 has a bearing surface 86 in which the inner member 82 rotates, and has openings 88 for flow of cooling liquid therethrough. The outer periphery 90 of the outer member 84 is cylindrical and is sized to slide freely into the liner 80 for assembly.

The bearing 74 is secured to the stator by projections which can expand linearly to engage the stator. While only one projection could be used, in the present construction a plurality of projections are provided. Two bores 92 are formed transverse to the axis of the bearing and in chordal relation to the bearing, and located within each bore 92 in the outer member 84 is an expandable pin or member 94 which has ends or projections 96 exposed to a liquid filling the stator cavity. The expandable members 94 are located axially generally midway between the ends of the bearing 74 and will expand in a linear direction. The expandable member 94 thus may be made of various materials, one such being nylon, which will expand upon contact with the liquid filling the motor. Upon expansion, the projections 96 of the members 94 will tightly engage the liner 80 to secure the outer member 84 against rotation.

The bearing 74 can be easily installed in the motor by slipping a shaft assembly including a shaft, rotor segments, and intermediate bearings into the stator. After the intermediate bearing 74 is installed in the motor, the stator cavity is filled with liquid causing the members 94 to expand and secure the bearing 74 in place.

It should be understood that the intermediate bearing 74 could be used with a motor having slots in its stator similar to the slots 69 shown in FIGS. 3 and 4. In such case, the projections 96 of the bearing 74 would be located to engage in the slots so as to prevent rotation of the bearing 74 but permit axial displacement thereof. It is to be further understood that the outer edge of the member 84 could be made of a different material from that of its inner portion.

In FIGS. 7 and 8 is shown yet another embodiment of an intermediate bearing 100 for use in a motor. The motor has a shaft 102, a stator 104, and a segmented rotor (not fully shown), adjacent the ends of the bearing 100. The stator 104 is similar to the stator 78 shown in FIGS. 5 and 6, and has a liner 106.

The intermediate bearing 100 comprises an inner annular member 108, similar to inner members 44, 64 and 82, and an outer member 110. The inner member 108 is secured to the shaft as by a key 114. The outer member 110 has openings 115 for passage of a cooling liquid and has on its inner periphery a bearing surface 116 in which the inner member 108 rotates. The outer periphery 118 of the outer member 110 is cylindrical and is sized to fit within the liner 106.

The bearing 100 is secured to the stator by one or more projections which may be driven outwardly by wedge means to engage the stator. In the present construction only one projection is provided. A radial bore 124 is located mid-way in the member 110, and within the bore 124 is a projection or pin 126 which is movable outwardly so that the outer end thereof engages the liner 106. Within the outer member 110 and parallel to the axis of the bearing is an axial bore 120, the major portion of the length thereof being enlarged as at 122.

In the bore 120 is a wedge means in the form of a wedge pin 128 which has a large end 130, a tapered middle portion 132, and a small end 134. The tapered portion 132 engages the inner end of the pin 126, causing the outer end of the pin 126 to tightly engage the stator 106 and secure the bearing 100 in place. The wedge pin 128 fits rather closely at its ends within the bore 120 but is movable therein, and the projection pin 126 fits closely at its outer end within the bore 124. The pins 126 and 128 may be coated with viscous material, such as silicone grease, to seal the bores and the pins. Thus, a cavity, indicated at 136, formed in the bore 122 is sealed liquid tight.

To secure the bearing 100 in the stator cavity, the shaft assembly including the shaft 102, rotor segments and intermediate bearings 100 are slipped into the stator cavity, and the ends of the stator cavity are closed. The stator is filled with liquid, but the liquid does not enter the cavity 136 of the bearing 100 since it is sealed. The pressure of the liquid in the stator may be increased by means such as by a water hammer effect or by an external pressure means connected to the stator. The rise in pressure causes a differential force to act on the wedge pin 128 since one end of the pin is larger in area than the other end. The wedge pin is thus caused to move in the direction of the differential force, and consequently, the tapered portion 132 of the wedge pin 128 drives the projection pin 126 outward radially into engagement with the liner 106 of the stator 104 to secure the bearing 100 in place. The effect of the differential force on the wedge pin 128 is increased by the mechanical advantage of the taper so that the bearing 100 is secured in place by considerable force. The taper portion 132 of the pin 128 is designed so as to jam into tight engagement with the pin 126. Further, as is shown in FIG. 7, preferably the large end 130 of the wedge pin 128 is above the small end 134 so that pin 128 cannot fall out.

It is to be understood that the intermediate bearing 100 can also be used with a stator having slots therein. In such case, the projection pin 126 can be located to engage a slot so as to further prevent rotation bearing but to permit axial displacement of the bearing. It is to be further understood that the outer portion of outer member 110 of the bearing 100 could be made of a softer material than the inner portion.

It will be apparent that a novel and useful intermediate bearing for use in a motor has been provided. The outer member of the bearing can be easily secured within the motor to prevent rotation while being axially shiftable to accommodate thermal expansion and contraction, and the bearing may be constructed with a soft outer periphery so as to prevent damage to the stator of the motor.

I claim:

1. In an electric motor having a stator, a rotor and a shaft, the improvement comprising an intermediate bearing for said shaft, including inner and outer annular members, said inner and outer members having bearing surfaces formed therebetween, said outer member having at least one projection engageable with said stator for preventing rotation of said bearing.

2. The combination of claim 1 and further comprising an interior liner within said stator and having at least one axial slot therein, said projection fitting in said slot and being axially slidable in said slot for accommodating expansion of motor parts.

3. The combination of claim 2, wherein said projection is generally rounded and is on the outer periphery of said outer member.

4. The combination of claim 1, wherein said outer member has an outer portion of relatively soft non-scratching material to prevent damaging the stator.

5. The combination of claim 1, wherein said bearing further comprises wedge means, and a pin fitting in a bore in said bearing, said projection being formed by one end of said pin, said wedge means driving said projection outwardly for engaging said stator.

6. The combination of claim 1, wherein said bearing further comprises an expandable member, the axis of said expandable member lying on a chord of said bearing, said projections being the ends of said expandable member, said expandable member expanding lengthwise to engage said stator.

7. In an electric motor having a stator, a rotor and a shaft, the improvement comprising an intermediate bearing for said shaft, said bearing comprising an inner member adjacent and secured to said shaft, and an outer member adjacent said stator and having a movable pin for engaging said stator to prevent rotation of said outer member.

8. The combination of claim 7, wherein said outer member has a bore therein and said pin is contained in said bore, said bearing further comprising wedge means lying transverse to said pin for moving said pin into engagement with said stator.

9. The combination of claim 8, wherein said wedge means has one surface and a second smaller surface, both surfaces being exposed to liquid pressure, a differential force being generated by said pressure on said surfaces for moving said wedge means.

10. The combination of claim 9, wherein said outer member has a second bore therein, and said wedge means comprises a wedge pin contained in said second bore, said pins and bores being sealed against liquid.

11. The combination of claim 7, wherein said outer member has a bore therein and said movable member comprises an expandable pin contained in said bore.

12. The combination of claim 11, wherein said expandable pin is located on a chord of said bearing.

13. The combination of claim 11, wherein said expandable pin expands upon contact with a liquid filling said stator.

* * * * *